United States Patent
Vambre

(10) Patent No.: US 9,784,386 B2
(45) Date of Patent: Oct. 10, 2017

(54) LARGE FLEXIBLE SUBMARINE CONDUIT SYSTEM

(71) Applicant: DCNS, Paris (FR)

(72) Inventor: Raphael Vambre, La Haie-Fouassiere (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 15/035,325

(22) PCT Filed: Nov. 12, 2014

(86) PCT No.: PCT/EP2014/074362
§ 371 (c)(1),
(2) Date: May 9, 2016

(87) PCT Pub. No.: WO2015/071300
PCT Pub. Date: May 21, 2015

(65) Prior Publication Data
US 2016/0290535 A1    Oct. 6, 2016

(30) Foreign Application Priority Data
Nov. 13, 2013  (FR) ..................................... 13 61089

(51) Int. Cl.
*F16L 11/02*    (2006.01)
*F16L 11/04*    (2006.01)
(Continued)

(52) U.S. Cl.
CPC ............... *F16L 11/02* (2013.01); *F03G 7/05* (2013.01); *F16L 1/15* (2013.01); *F16L 11/042* (2013.01);
(Continued)

(58) Field of Classification Search
CPC .. F16L 11/02; F16L 11/04; F16L 11/08; F16L 11/10; F16L 11/042; F03G 7/05
(Continued)

(56) References Cited

U.S. PATENT DOCUMENTS 3,230,967 A * 1/1966 Castro .................... B65D 88/78
                                                         137/236.1
3,548,605 A * 12/1970 Armistead .............. E02B 15/08
                                                         210/918
(Continued)

FOREIGN PATENT DOCUMENTS

EP    0 014 659 A1    8/1980
FR    762 731 A       4/1934

OTHER PUBLICATIONS

International Search Report, dated Jan. 15, 2015, from corresponding PCT application.
(Continued)

*Primary Examiner* — Frederick L Lagman
(74) *Attorney, Agent, or Firm* — Young & Thompson

(57) ABSTRACT

This large flexible submarine conduit system (10) for a platform floating at sea includes:
 a flexible conduit (12) including a plurality of sheets (26A, 26B, 26C) linked together by a sliding closure (28) on each of the lateral sides of the sheets, the conduit (12) including elements for maintaining a circular cross-section of the conduit (12) that are both flexible and flattenable; and
 a device capable of being placed on the platform at the upper end of the conduit (12), allowing winding and unwinding of each of the sheets (26A, 26B, 26C) of the conduit (12), this device including a drum (14A, 14B, 14C) for each of the sheets (26A, 26B, 26C).

10 Claims, 2 Drawing Sheets

(51) Int. Cl.
  *F16L 11/10*  (2006.01)
  *F03G 7/05*  (2006.01)
  *F16L 11/08*  (2006.01)
  *F16L 11/12*  (2006.01)
  *F16L 1/15*  (2006.01)

(52) U.S. Cl.
  CPC ............ *F16L 11/085* (2013.01); *F16L 11/12* (2013.01); *F16L 11/10* (2013.01); *Y02E 10/34* (2013.01)

(58) Field of Classification Search
  USPC .......... 405/60; 138/120, 128, 157, 162, 166, 138/168
  See application file for complete search history.

(56) References Cited

U.S. PATENT DOCUMENTS

| | | | | |
|---|---|---|---|---|
| 3,561,220 A | * | 2/1971 | Riester | .................... E02B 15/08 405/60 |
| 4,176,863 A | * | 12/1979 | Wetmore | .................. F03G 7/05 138/155 |
| 4,221,504 A | * | 9/1980 | Person | .................... E21B 7/128 114/264 |
| 4,358,225 A | | 11/1982 | Van Der Pot et al. | |
| 4,373,834 A | * | 2/1983 | Grace | .................. E21B 43/0122 405/209 |
| 4,395,157 A | * | 7/1983 | Cunningham | ...... E21B 43/0122 405/195.1 |
| 4,497,342 A | | 2/1985 | Wenzel et al. | |
| 4,603,553 A | * | 8/1986 | Ridgway | .................. F03G 7/05 137/236.1 |
| 2010/0129160 A1 | * | 5/2010 | Bailey | .................. B63B 21/502 405/223.1 |
| 2010/0275597 A1 | * | 11/2010 | Kuo | .......................... F16L 1/15 60/641.7 |
| 2011/0293372 A1 | * | 12/2011 | Later | .................. E21B 43/0122 405/60 |
| 2011/0318106 A1 | * | 12/2011 | Gateff | .................... B63C 7/006 405/60 |
| 2015/0322928 A1 | * | 11/2015 | Rekret | ..................... F03G 7/05 60/641.7 |

OTHER PUBLICATIONS

FR Search Report, dated Jul. 2, 2014, from corresponding FR application.

* cited by examiner

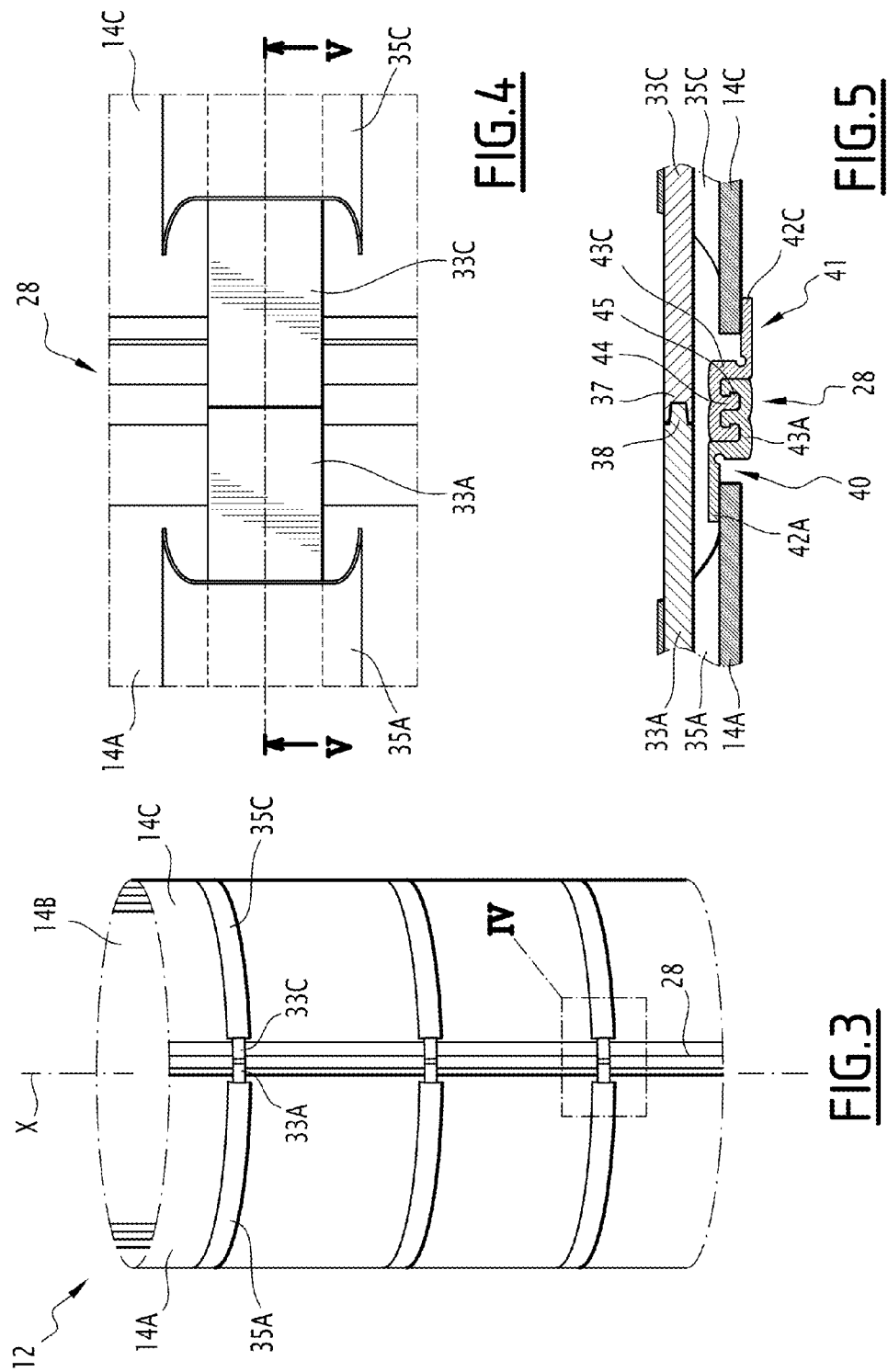

LARGE FLEXIBLE SUBMARINE CONDUIT SYSTEM

The present invention generally relates to a large flexible submarine conduit system for a platform floating at sea.

The present invention also relates to a flexible submarine conduit, extensible and retractable between a non-deployed state and an operational state, able to conduct seawater from a lower end toward an upper end in the operational state.

Such a large flexible submarine conduit is in particular usable in electricity production facilities by using ocean thermal energy (OTE).

More specifically, this production is partially based on the use of low-temperature seawater (typically 5° C.) in large quantities. To benefit from a maximum temperature difference, OTE facilities are generally designed to be used in tropical zones.

The means commonly considered for using this cold source in the thermodynamic method is to pump large quantities of seawater at significant depths to a platform floating at sea.

Long conduits are therefore necessary to perform this pumping. In general, the length of these conduits is approximately 1000 m, and their diameter can reach several meters.

Furthermore, being placed in the submarine environment, these conduits must generally withstand extreme environmental and weather conditions.

Thus, for example, a cyclone or storm can seriously damage the conduit and make it subsequently unusable. In some cases, it is even possible to consider raising the conduit onto the floating platform, for example if a weather warning announcing storms has been issued. Typically, such weather warnings are accessible two to three days in advance.

Sometimes, the conduit may also require maintenance or a partial repair, which can be done only by raising the conduit.

These two examples show that it is important to be able to raise such a conduit during its operation within a reasonable length of time.

In the known flexible conduit systems (for example, see U.S. Pat. No. 4,358,225), the conduit is made up of a series of annular modules that are gradually assembled to one another or disassembled.

This does not allow fast enough raising of the conduit, in particular in case of storm warning.

The aim of the present invention is to propose a large flexible submarine conduit system suitable for allowing rapid raising of the flexible submarine conduit.

To that end, the invention relates to a flexible submarine conduit system comprising:
- a flexible conduit including a plurality of sheets linked together by a sliding closure on each of the lateral sides of said sheets, the conduit comprising means for maintaining a circular cross-section of the conduit which are both flexible and flattenable;
- a device capable of being placed on the platform at the upper end of the conduit, allowing winding and unwinding of each of the sheets of the conduit, this device comprising a drum for each of the sheets.

According to specific embodiments of the invention, the system includes one or more of the following features:
- the sheets are in a single piece and made from a textile material;
- the sheets are made from a non-self-supporting material;
- the maintaining means are flexible battens having a bowed shape when idle, the battens being inserted into sheaths present on each sheet;
- the number of sheets is comprised between 2 and 4, and is preferably 3;
- each sheet comprises a ballast in its lower part to ensure the stability of the conduit during its deployment;
- all of the sheets comprise a shared ballast;
- the ballast comprises a filter; and
- the ballast also comprise a pump.

The invention also proposes a flexible submarine conduit for a system as defined above, comprising several sheets connected to one another by a sliding closure on each of their lateral sides, the conduit comprising means for maintaining a circular cross-section of the conduit which are both flexible and flattenable.

The invention also relates to the use of such a system for the exploitation of ocean thermal energy.

The invention will be better understood upon reading the following description, provided solely as an example and done in reference to the drawings, in which:

FIG. 3 is a diagrammatic perspective view of a flexible submarine conduit according to the invention;

FIG. 4 is an enlarged view of detail IV of FIG. 3; and

FIG. 5 is part of a horizontal cross-section of FIG. 3, along line V-V of FIG. 4.

Figure 1:
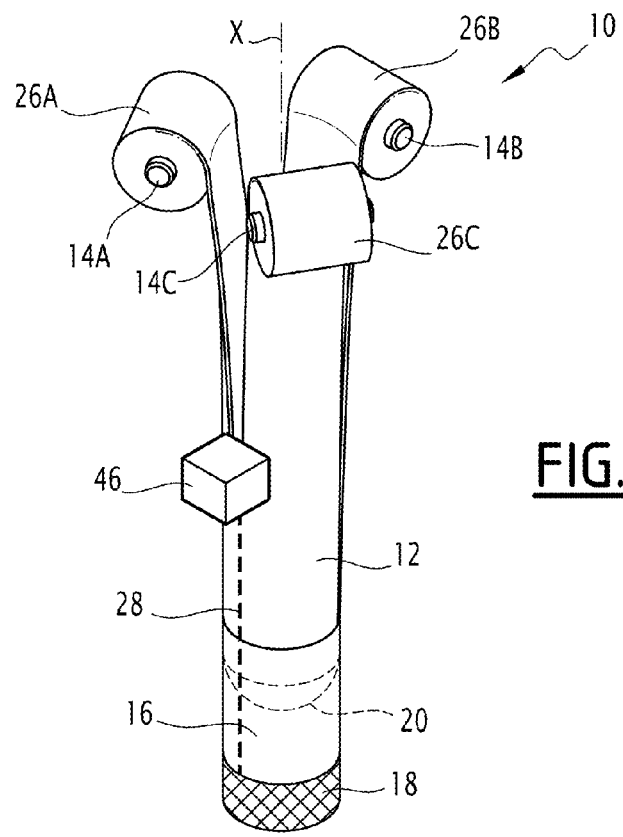
FIG. 1 is a diagrammatic perspective view of a flexible submarine conduit system according to the invention.

A flexible submarine conduit system 10 is illustrated in FIG. 1. This system 10 comprises a flexible submarine conduit 12 that is extensible and retractable between a non-deployed state and an operational state and able to conduct seawater from a lower end toward an upper in the operational state.

The system 10 also comprises three drums 14A, 14B and 14C situated at the upper end of the conduit 12.

Figure 2:
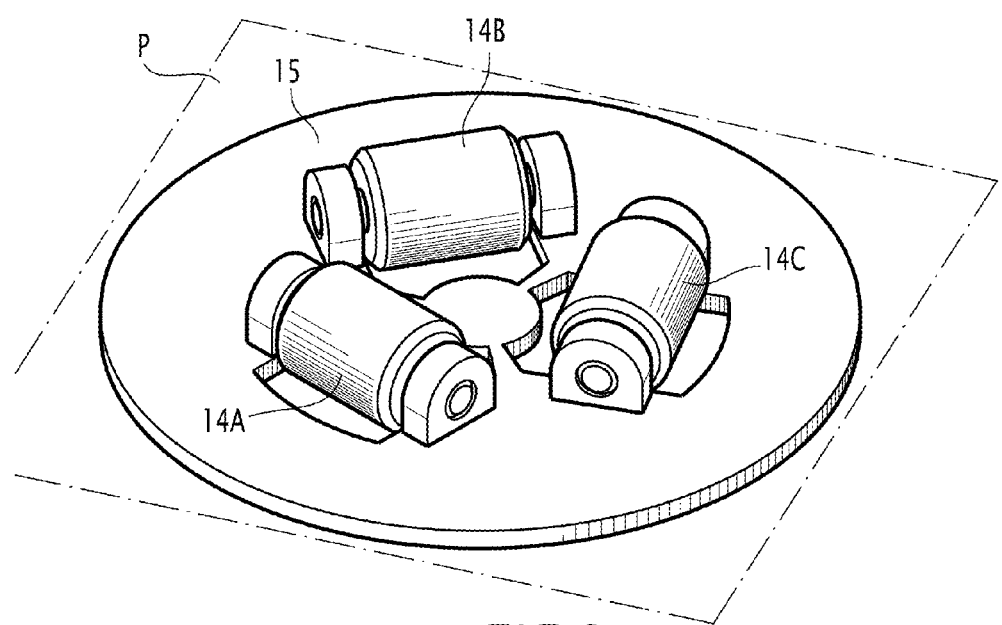
FIG. 2 is a partial diagrammatic perspective view of a floating platform and drums that are part of the system of FIG. 2.

The drums 14A, 14B and 14C are installed on a support 15 secured to a platform P floating at sea, as shown in FIG. 2.

The lower end of the conduit 12 is intended to be submerged at great depths in the sea. These depths are for example comprised between 800 and 1200 m.

Thus, the flexible conduit 12 is able to conduct cold deep water up to the platform P. This cold water, the temperature of which is generally comprised between 3 and 7° C., is for example used in a thermodynamic electricity production method by using ocean thermal energy (OTE). The facility is situated on the platform P.

In order to ensure a certain stability for the conduit 12 in deep waters, the system 10 includes a ballast 16 placed at the lower end of the conduit 12, as illustrated in FIG. 1.

This ballast 16 is for example formed by an annular segment with a diameter substantially equal to that of the conduit 12.

It is for example completed by a filter 18 making it possible to avoid the introduction of foreign bodies, plants or underwater animals in the conduit.

The water circulation in the conduit 12 is provided by a pump 20 situated in the lower part of the conduit 12, the latter thus working in overpressure.

According to another example embodiment, the pump 20 is placed in the upper part of the conduit 12 and then works in vacuum.

According to still another example embodiment, the ballast 16 comprise the pump 20 and the filter 18.

As illustrated in FIG. 1, the conduit 12 is formed by three sheets 26A, 26B and 26C. Each sheet 26A, 26B or 26C for example comprises a panel with a length substantially equal to that of the conduit 12 in the operational state.

The sheets 26A, 26B and 26C are each able to be wound on the corresponding drum 14A, 14B and 14C in the non-deployed state of the conduit 12.

Furthermore, each sheet 26A, 26B or 26C is able to be wound on the corresponding drum 14A, 14B or 14C in a flattened manner.

In the operational state of the conduit 12, the sheets 26A, 26B and 26C define a tubular space extending along a substantially vertical axial direction X as shown in FIG. 1.

The diameter of this tubular space is for example comprised between 1.8 and 2.2 m.

According to the example embodiment in which the pump 20 is placed in the upper part of the conduit 12, the ballast 16 and the filter 18 are thus made in three parts to be connected to one another in the operational state of the conduit 12. They are further able to be separated in the non-deployed state of the conduit 12 in order to allow quasi-complete winding of the sheets 26A, 26B and 26C on the drums 14A, 14B and 14C.

According to another example embodiment, the ballast 16 and the filter 18 are each made in a single piece. Other example embodiments of these components are also possible.

In order to form the tubular space, each sheet 26A, 26B and 26C includes a sliding closure 28 on each of its two lateral sides. This closure 28 is able to connect the sheets 26A, 26B and 26C to one another and will be described in more detail below.

Each sheet includes an inner surface oriented toward the inner part of the tubular space and an outer surface oriented toward the opposite direction.

According to a first embodiment, the sheets 26A, 26B and 26C are made from a non-self-supporting material without shape memory. This material is for example represented by a fabric or a nonwoven with a coated fibrous structure. In particular, this material is for example a membrane of the glass fiber and silicone or PVC coating support type.

According to a second embodiment, the sheets 26A, 26B and 26C are made from a flexible material with shape memory.

Thus, a bowed shape is defined by each of the three sheets 26A, 26B or 26C to form a cylinder with a substantially circular cross-section in the operational state of the conduit 12.

In the non-deployed state of the conduit 12, the bowed shapes of this material are able to be flattened in order to allow the flat winding on the drums 14A, 14B and 14C.

In the first embodiment, the circular shape of the conduit 12 is provided by the flexible battens 33A, 33B and 33C shown in FIG. 3.

To that end, each sheet 14A, 14B and 14C includes a plurality of respective sheaths 35A, 35B and 35C distributed along the corresponding sheet, at different levels.

Each sheaths defines a receiving space for a corresponding batten 33A, 33B and 33C and extends substantially perpendicular to the two lateral sides of the corresponding sheet.

The sheaths 35A, 35B and 35C are for example made from a material substantially identical to that of the sheets 14A, 14B and 14C.

In the example embodiment illustrated in FIG. 3, the sheaths 35A, 35B and 35C are formed by continuous enclosures each situated on the outer surface of the corresponding sheet and including an opening allowing the reception of the battens 33A, 33B and 33C at each of its two ends.

According to another example embodiment, the sheaths are situated on the outer surfaces of the sheets and are discontinuous. In other words, in this example, each sheath includes a plurality of loops distributed along the sheath.

According to still another example embodiment, the sheaths 35A, 35B and 35C, continuous or discontinuous, are situated on the inner surfaces of the corresponding sheets.

The battens 33A, 33B and 33C are made from a flexible shape memory material. When idle, each batten defines a bowed shape in the form of a third of a circle. In the non-deployed state of the conduit 12, the battens are able to be flattened and wound on the drums 14A, 14B, 14C with the corresponding sheets.

In the operational state of the conduit 12, all of the battens 33A, 33B and 33C situated at the same level to find a circular ring with a diameter substantially equal to that of the conduit 12.

To that end, the battens include interconnection means making it possible to define a continuous circular ring, as shown in FIGS. 3 to 5.

Thus, each batten includes a receiving end 37 defining a hollow space, for example with a converging shape, and a protruding end 38 with a shape substantially complementary to this hollow space, as shown in FIG. 5.

The slide closure 28 is shown in FIGS. 3 to 5. In these figures, the closure 28 represents the product marketed by the company ILLINOIS TOOL WORKS under the MAXI-GRIP® brand.

In this example embodiment, the closure 28 comprises two parts 40 and 41. Each of the two parts 40 and 41 comprises a support part 42A, 42B and 42C respectively sewn to each sheet 14A, 14B and 14C, all along the corresponding lateral sides of that sheet, and a closure part 43A, 43B and 43C.

Thus, for example, in FIG. 5, the part 42A is on the outer surface of the sheet 14A, and the associated part 43A is oriented toward the inside. Likewise, the part 42C is sewn on the inner surface of the sheet 14C, and the associated part 43C is oriented toward the outside.

The two adjacent parts 43 define conjugated shapes situated toward one another and adapted for interpenetrating one another like a slide closure, thus linking the two adjacent sheets.

In this example, the parts 43 comprise two fingers 44 with an end 45 curved in an undercut.

The parts 40 and 41 are able to be separated in the non-deployed state of the conduit 12.

Of course, this closure 28 provides the sealing of the link between the two adjacent sheets and is able to bear the forces exerted on the conduit 12.

As illustrated in FIG. 1, the system 10 further includes three engagement means 46 secured to the support 15, making it possible to ensure the linking of the two parts 43 of the adjacent sheets during the unwinding of the sheets.

The operation of the system 10 will now be described.

The system 10 is initially installed on the floating platform P and the conduit 12 is in the non-deployed state.

Thus, each sheet 26A, 26B or 26C is wound on the corresponding drum 14A, 14B or 14C.

All of the battens 35A, 35B and 35C are also wound flat with the corresponding sheets.

Based on the production of the ballast 16, the filter 18 and the pump 20, they are attached to or detached from the sheets 26A, 26B and 26C at this stage.

The lower end of the three sheets is first engaged in the engagement means 46, to connect the sheets to one another.

The extension of the conduit 12 therefore first begins by placing the ballast 16, the filter 18, and the pump 20 if it is able to be placed there, in the lower part of the conduit 12.

If the ballast 16 and the filter 18 are made in three parts, their placement also includes the assembly of these three parts. Otherwise, the ballast 16 and the filter 18 can already be positioned on the three parts of the conduit whereof the end is partially unwound.

Next, the sheets 26A, 26B and 26C begin their unwinding from the drums 14A, 14B and 14C. Owing to its weight, the ballast 16 provides the sheets with a sufficient force so that this unwinding can take place.

Of course, other means facilitating the unwinding, such as electric motors or mechanical means in the drums, for example, can also be considered.

The sheets 26A, 26B and 26C are connected to one another, over the course of the unwinding, using parts 43 of the closure 28.

Once they leave the drums 14A, 14B and 14C, the battens 33A, 33B and 33C assume their bowed shape and thus define a bowed shape for each of the sheets 26A, 26B and 26C.

All of the battens 33A, 33B and 33C situated on a same level next form a continuous ring. Guided by the slide closure 28, the protruding end 38 enters the hollow space of the receiving end 37.

Thus, the three sheets 26A, 26B and 26C define a tubular space with axis X.

In this state, the conduit 12 is ready to conduct the water.

If it is necessary to raise the conduit 12, in the case of a storm warning or for maintenance, for example, the described method is carried out in the reverse order.

The extension and raising of the conduit can be done particularly quickly, for example the raising of a conduit 1000 m long can be done in less than 24 hours, which corresponds to a linear speed of less than 1 m/min. This duration is compatible with a weather warning, which is generally announced two to three days in advance.

The invention claimed is:

1. A large flexible submarine conduit for a platform floating at sea, comprising:
    a plurality of sheets linked together by a sliding closure on each of their lateral sides, and
    maintaining elements for maintaining a circular cross-section of the conduit,
    wherein said maintaining elements are both flexible and flattenable, so as to allow the maintaining elements to be wound flat on drums with the corresponding sheets.

2. A large flexible submarine conduit system for a platform floating at sea, comprising:
    a large flexible submarine conduit according to claim 1; and
    a device capable of being placed on the platform at the upper end of the conduit, allowing winding and unwinding of each of the sheets of the conduit, this device comprising a drum for each of the sheets,
    wherein the maintaining elements for maintaining a circular cross-section of the conduit are both flexible and flattenable, so as to allow the maintaining elements to be wound flat on the drums with the corresponding sheets of said conduit.

3. The system according to claim 2, wherein the sheets of the conduit are in a single piece and made from a textile material.

4. The system according to claim 2, wherein:
    the sheets of the conduit are made from a non-self-supporting material; and wherein
    the maintaining elements are flexible battens having a bowed shape when idle, the battens being inserted into sheaths present on each sheet.

5. The system according to claim 2, wherein the number of sheets of the conduit is comprised between 2 and 4.

6. The system according to claim 5, wherein the number of sheets of the conduit is 3.

7. The system according to claim 2, wherein each sheet of the conduit comprises a ballast in its lower part to ensure the stability of the conduit during its deployment.

8. The system according to claim 7, wherein all of the sheets of the conduit comprise a shared ballast.

9. The system according to claim 7, wherein the ballast comprises a filter.

10. The system according to claim 9, wherein the ballast further comprises a pump.

* * * * *